United States Patent
Rachiele et al.

(10) Patent No.: US 11,007,750 B2
(45) Date of Patent: *May 18, 2021

(54) PREPARATION METHOD OF A COATED SHEET COMPRISING THE APPLICATION OF AN AQUEOUS SOLUTION COMPRISING AN AMINO ACID AND ITS ASSOCIATED USE FOR IMPROVING THE COMPATIBILITY WITH AN ADHESIVE

(71) Applicant: ArcelorMittal, Luxembourg (LU)

(72) Inventors: Lydia Rachiele, Rombas (FR); Herve Derule, Montoy Flanville (FR); Delphine Thai, Bousse (FR)

(73) Assignee: ARCELORMITTAL, Luxembourg (LU)

( * ) Notice: Subject to any disclaimer, the term of this patent is extended or adjusted under 35 U.S.C. 154(b) by 79 days.

This patent is subject to a terminal disclaimer.

(21) Appl. No.: 15/546,421

(22) PCT Filed: Feb. 1, 2016

(86) PCT No.: PCT/IB2016/050507
§ 371 (c)(1),
(2) Date: Jul. 26, 2017

(87) PCT Pub. No.: WO2016/120856
PCT Pub. Date: Aug. 4, 2016

(65) Prior Publication Data
US 2018/0015694 A1    Jan. 18, 2018

(30) Foreign Application Priority Data

Jan. 30, 2015  (WO) .................. PCT/IB2015/050723

(51) Int. Cl.
*B32B 7/12*    (2006.01)
*C23C 2/06*    (2006.01)
(Continued)

(52) U.S. Cl.
CPC .............. *B32B 7/12* (2013.01); *B32B 15/011* (2013.01); *B32B 37/1284* (2013.01); *C23C 2/06* (2013.01);
(Continued)

(58) Field of Classification Search
CPC ...................................... C23C 22/53
See application file for complete search history.

(56) References Cited

U.S. PATENT DOCUMENTS 3,625,744 A * 12/1971 Juna .................. B05D 1/60
427/518
3,985,695 A * 10/1976 Tobias .................. C08G 59/42
523/402
(Continued)

FOREIGN PATENT DOCUMENTS

CN    101857958 A    10/2010
EP    2 458 031    5/2012
(Continued)

OTHER PUBLICATIONS

M. Atif, A study on the effects of photosensitizer concentration on singlet oxygen mediated photobleaching, Laser Phys. 23 (2013).*
(Continued)

*Primary Examiner* — James M Mellott
(74) *Attorney, Agent, or Firm* — Davidson, Davidson & Kappel, LLC

(57) ABSTRACT

A method for preparing a metal sheet (1) is provided including at least the steps for:
providing a steel substrate (3) having two faces (5), at least one of which is coated with a metal coating (7) comprising at least 40% by weight of zinc,
applying on the outer surface (15) of the metal coating (7) an aqueous solution comprising an amino acid,
and the metal sheet which may be obtained.

21 Claims, 2 Drawing Sheets

(51) Int. Cl.

| | |
|---|---|
| *C23C 2/26* | (2006.01) |
| *C23C 22/82* | (2006.01) |
| *C23C 22/07* | (2006.01) |
| *C23C 22/68* | (2006.01) |
| *C23C 22/53* | (2006.01) |
| *C23C 22/83* | (2006.01) |
| *B32B 15/01* | (2006.01) |
| *B32B 37/12* | (2006.01) |
| *C25D 3/22* | (2006.01) |
| *C25D 3/56* | (2006.01) |
| *C25D 5/48* | (2006.01) |
| *C23F 11/14* | (2006.01) |

(52) U.S. Cl.
CPC ............... *C23C 2/26* (2013.01); *C23C 22/07* (2013.01); *C23C 22/53* (2013.01); *C23C 22/68* (2013.01); *C23C 22/82* (2013.01); *C23C 22/83* (2013.01); *C23F 11/144* (2013.01); *C25D 3/22* (2013.01); *C25D 3/56* (2013.01); *C25D 3/565* (2013.01); *C25D 5/48* (2013.01); *B32B 2255/06* (2013.01); *B32B 2255/205* (2013.01); *B32B 2311/30* (2013.01)

(56) References Cited

U.S. PATENT DOCUMENTS

| | | | | |
|---|---|---|---|---|
| 4,169,916 | A * | 10/1979 | Tsutsui | C23C 22/62 428/447 |
| 4,765,871 | A * | 8/1988 | Hsu | C25D 3/565 205/246 |
| 5,091,223 | A * | 2/1992 | Mori | C23C 22/68 427/383.7 |
| 5,209,788 | A * | 5/1993 | McMillen | C23C 22/83 148/247 |
| 6,162,508 | A | 12/2000 | Trumble et al. | |
| 6,432,220 | B1 | 8/2002 | Lindemann | |
| 2002/0081452 | A1 * | 6/2002 | Nakajima | C23C 2/14 428/659 |
| 2004/0104122 | A1 * | 6/2004 | Bibber | C23C 22/53 205/196 |
| 2005/0121114 | A1 | 6/2005 | Fenandez Gonzalez et al. | |
| 2006/0193988 | A1 | 8/2006 | Walter et al. | |
| 2008/0230395 | A1 | 9/2008 | Inbe et al. | |
| 2010/0261024 | A1 * | 10/2010 | Sakashita | C23F 11/149 428/457 |
| 2014/0360630 | A1 * | 12/2014 | Arnold | C23C 22/83 148/247 |
| 2015/0140280 | A1 | 5/2015 | Inbe et al. | |
| 2015/0352825 | A1 | 12/2015 | Richard et al. | |
| 2016/0010216 | A1 | 1/2016 | Allely et al. | |
| 2018/0057946 | A1 * | 3/2018 | Dadvand | C23C 22/53 |

FOREIGN PATENT DOCUMENTS

| | | |
|---|---|---|
| JP | S49009020 B | 3/1974 |
| JP | S50115138 A | 9/1975 |
| JP | H08 296 053 | 11/1996 |
| JP | 2002086613 A | 3/2002 |
| JP | 2002363799 A | 12/2002 |
| JP | 2005529189 A | 9/2005 |
| JP | 2005325404 A | 11/2005 |
| JP | 2006519307 A | 8/2006 |
| JP | 2007284710 | 11/2007 |
| JP | 2008088552 A | 4/2008 |
| JP | 2009068085 A | 4/2009 |
| WO | WO 2008/076684 | 6/2008 |
| WO | WO2013/160568 | 10/2013 |

OTHER PUBLICATIONS

International Search Report of PCT/IB2016/050507 dated May 9, 2016, 3 pages.

* cited by examiner

PREPARATION METHOD OF A COATED SHEET COMPRISING THE APPLICATION OF AN AQUEOUS SOLUTION COMPRISING AN AMINO ACID AND ITS ASSOCIATED USE FOR IMPROVING THE COMPATIBILITY WITH AN ADHESIVE

The present invention relates to a metal sheet comprising a steel substrate having two faces, at least one of which is coated with a metal coating comprising at least 40% by weight de zinc, to its preparation method and to the use of an amino acid for improving the compatibility of the metal sheets coated with coatings based on zinc with an adhesive.

Before being used, the coated steel sheets are generally subject to diverse surface treatments.

BACKGROUND

The application WO 2008/076684 describes the application on a steel sheet coated with zinc, on an electro-zinc-containing steel sheet or on a galvanized steel sheet of a pre-treatment composition consisting in an aqueous solution comprising a compound comprising a metal of the group IIIB (Sc, Y, La, Ac) or of the group IVB (Ti, Zr, Hf, Rf) and a compound based on copper, for example copper aspartate or copper glutamate, followed by the application of a composition comprising a film-forming resin and a yttrium-based compound. This treatment with a compound based on copper is described as improving the adhesion between the metal sheet and the subsequent layer, such as a cataphoretic paint, and its resistance to corrosion.

The application EP 2 458 031 describes the application on a galvanized steel sheet GI, or alloyed galvanized steel sheet GA, of a conversion treatment solution comprising a compound (A) selected from among water-soluble titanium or zirconium compounds and an organic compound (B) which may notably be glycine, alanine, asparagine, glutamic or aspartic acid in a neutral or salt form. According to this application, the compound (A) forms on the sheet a conversion film which improves the compatibility of the metal sheet with the coatings applied subsequently, such as cataphoretic paints and its resistance to corrosion. The compound (B) is described as a stabilizer of compound (A).

These coated steel sheets are for example intended for the automotive field. The metal coatings essentially comprising zinc are traditionally used for their good protection against corrosion.

In the automotive industry notably, the sheets are frequently assembled by means of adhesives for producing certain portions of the vehicles, such as for example door sills.

In the automotive industry, the association of a metal sheet with an adhesive is usually evaluated by means of a tensile test on a specimen formed with two tabs of the metal sheet, these tabs being adhesively bonded on a portion of their surface by the adhesive.

In this case, the adhesion of the adhesive on the metal sheet is evaluated on the one hand by the measurement of the tensile stress at the breakage and on the other hand the compatibility of the adhesive and of the metal sheet by visual determination of the nature of the breakage.

In this case it is possible to mainly observe three types, or faces of the breakage:
cohesive breakage, when the breakage takes place in the thickness of the adhesive,
adhesive breakage (FIG. 4), when the breakage takes place at one of the interfaces between the tabs and the adhesive,
surface cohesive breakage (FIG. 3), when the breakage takes place in the adhesive in the vicinity of an interface between the tabs and the adhesive.

In the automotive industry, it is sought to avoid adhesive breakages which express poor compatibility of the adhesive with the metal sheet, and this both before ageing of the adhesive than after ageing.

Now, the tensile tests show too many adhesive breakages during the use of certain usual adhesives for the automotive industry on metal sheets coated with zinc.

Such adhesive breakage proportions are not acceptable for automotive builders, which may limit the use of these coatings for certain applications.

SUMMARY OF THE INVENTION

One of the objects of the invention is therefore to propose a method for preparing a steel sheet coated with a metal coating comprising at least 40% by weight of zinc which has better compatibility with the adhesives and therefore limits the risks of adhesive breakage.

Another of the objects of the invention is to propose a method further having better compatibility with the adhesives even after ageing of the latter.

It is also known that the chemical or electrochemical stripping methods of annealing under certain atmospheric conditions, of galvanization or further of electro-zinc-plating generate an absorption of hydrogen by the steel. This hydrogen generates embrittlement and may be removed by a thermal degassing treatment, which typically consists in annealing based on a temperature of the order of 200° C. Such a treatment is generally accomplished at the end of the method for preparing the metal sheet, typically after the step for applying a grease or oil film on the outer surface 15 of the metal coating 7.

The application provides a method for preparing a steel sheet coated with a metal coating comprising at least 40% by weight of zinc which advantageously retains better compatibility with the adhesives after thermal degassing treatment.

For this purpose, the invention relates to a method for preparing a metal sheet 1 comprising at least the steps of:

providing a steel substrate 3, at least one face 5 of which is coated with a metal coating 7 comprising at least 40% by weight of zinc, applying on the outer surface 15 of the metal coating 7 an aqueous solution comprising an amino acid selected from among alanine, arginine, aspartic acid, cysteine, lysine, methionine, proline, threonine, valine, and a mixture thereof, each amino acid being in a neutral or salt form, the aqueous solution being free of compound comprising a metal from the group IIIB or from the group IVB, and the mass percentage as dry extract of the amino acid in neutral or salt form or of the mixture of amino acids in neutral or salt forms in the aqueous solution being greater than or equal to 50%.

The method may also comprise the following features, taken individually or as a combination:

the method comprises a preliminary step for preparing the steel substrate 3, at least one face 5 of which is coated with a metal coating 7, selected from among hot galvanization and electro-zinc-plating of the steel substrate 3;

the metal coating 7 is to be selected from a zinc coating GI, a zinc coating GA, a zinc and aluminum alloy, a zinc and magnesium alloy and a zinc, magnesium and aluminum alloy;

the metal coating 7 comprises between 0.1 and 10% by weight of Mg and optionally between 0.1 and 20% by weight of Al, the remainder of the metal coating being Zn, the inevitable impurities and optionally one or several additional elements selected from among Si, Sb, Pb, Ti, Ca, Mn, Sn, La, Ce, Cr, Ni or Bi;

the amino acid is selected from among alanine, aspartic acid, cysteine, methionine, proline, threonine, valine and a mixture thereof, each amino acid being in a neutral or salt form;

the amino acid is selected from among proline in a neutral or salt form, cysteine in a neutral or salt form, and a mixture thereof;

the steel substrate 3, at least one face 5 of which is coated with a metal coating 7, was prepared by electro-zinc-plating and the amino acid is selected from among aspartic acid, cysteine, methionine, proline, threonine or a mixture thereof, each amino acid being in a neutral or salt form;

the steel substrate 3 at least one face 5 of which is coated with a metal coating 7 was prepared by hot galvanization and the amino acid is selected from among alanine, proline, threonine and valine, and a mixture thereof, each amino acid being in a neutral or salt form;

the amino acid is proline in a neutral or salt form;

the amino acid is threonine in a neutral or salt form;

the amino acid is a mixture of proline and threonine, the proline and threonine being in a neutral or salt form;

the aqueous solution comprises from 1 to 200 g/L of amino acid in a neutral or salt form or of a mixture of amino acids in neutral or salt forms;

the aqueous solution comprises from 10 to 1,750 mmol/L of amino acid in a neutral or salt form or a mixture of amino acids in neutral or salt forms;

the mass percentage in dry extract of the amino acid in a neutral or salt form or of the mixture of amino acids in neutral or salt forms in the aqueous solution is greater than or equal to 75%;

the aqueous solution has a pH comprised between a pH equal to the (isoelectric point of the amino acid−3) and a pH equal to the (isoelectric point of the amino acid+1), preferably comprised between a pH equal to the (isoelectric point of the amino acid−3) and a pH equal to the (isoelectric point of the amino acid−1);

the aqueous solution is applied at a temperature comprised between 20 and 70° C.;

the solution is applied for a period comprised between 0.5 s and 40 s on the outer surface 15 of the metal coating 7;

the solution is applied by roll coating;

the method comprises, after the application step on the outer surface 15 of the metal coating 7 of an aqueous solution comprising an amino acid, a drying step;

the drying is carried out by subjecting the metal sheet 1 to a temperature comprised between 70 and 120° C. for 1 to 30 seconds;

the method comprises, after the application step on the outer surface 15 of the metal coating 7 of an aqueous solution comprising an amino acid and the optional drying step, a step for applying a film of grease or oil on the outer surface 15 of the coating 7 coated with a layer comprising an amino acid or a mixture of amino acids;

the method comprises, after the application step on the outer surface 15 of the metal coating 7 of an aqueous solution comprising an amino acid, the optional drying step and the optional step for applying a film of grease or oil, a step for shaping the metal sheet 1;

the shaping of the metal sheet 1 is achieved by drawing;

the method comprises, after the application step on the outer surface 15 of the metal coating 7 of an aqueous solution comprising an amino acid, the optional drying step, the optional step for applying a film of grease or oil, the optional step for shaping the metal sheet 1, a step for applying locally an adhesive 13 on at least one outer surface 15 of a metal coating 7 coated with a layer comprising an amino acid or a mixture of amino acids.

The invention also relates to a metal sheet which may be obtained by a method according to the invention, wherein at least one portion of at least one outer surface 15 of the metal coating 7 can be coated with a layer comprising from 0.1 to 200 mg/m$^2$ of amino acid in a neutral or salt form or a mixture of amino acids in neutral or salt forms, and/or wherein at least one portion of at least one outer surface 15 of the metal coating 7 can be coated with a layer comprising from 50 to 100% by weight of amino acid in a neutral or salt form, or of a mixture of amino acids in neutral or salt forms.

The invention also relates to this metal sheet, obtainable by the method comprising, after the application step on the outer surface 15 of the metal coating 7 of an aqueous solution comprising an amino acid, the optional drying step, the optional step for applying a film of grease or oil, the optional step for shaping the metal sheet 1, a step for applying locally an adhesive 13 on at least one outer surface 15 of a metal coating 7 coated with a layer comprising an amino acid or a mixture of amino acids, and wherein the metal sheet comprises an adhesive 13 locally present on at least one outer surface 15 of the metal coating 7 coated with a layer comprising an amino acid or a mixture of amino acids.

The invention also relates to an assembly comprising:

a first metal sheet 1 as defined above, and a second metal sheet, the first metal sheet 1 and the second metal sheet being assembled via the adhesive 13 locally present on at least one outer surface 15 of the metal coating 7 of the first metal sheet 1, and to the following uses:

the use of an aqueous solution comprising an amino acid selected from among alanine, arginine, aspartic acid, glutamic acid, cysteine, glycine, lysine, methionine, proline, threonine, valine, and a mixture thereof, each amino acid being in a neutral or salt form, the aqueous solution being free of compound comprising a metal from the group IIIB or from the group IVB, in order to improve the compatibility, with an adhesive 13, of at least one portion of an outer surface 15 of a metal coating 7 coating at least one face 5 of a steel substrate 3, wherein the metal coating 7 comprises at least 40% by weight of zinc;

the use of an aqueous solution comprising an amino acid selected from among proline, threonine and a mixture thereof, the proline and the threonine being independently in a neutral or salt form, the aqueous solution being free of compound comprising a metal from the group IIIB or from the group IVB, for:

improving the compatibility with an adhesive 13, of at least one portion of an outer surface 15 of a metal coating 7 coating at least one face 5 of a steel substrate 3, improving the resistance to corrosion of the outer surface 15 of the metal coating 7 coating at least one face 5 of the steel substrate 3, and improving the tribological properties of the outer surface 15 of the metal coating 7 coating at least one face 5 of the steel substrate 3, wherein the metal coating 7 comprises at least 40% by weight of zinc.

BRIEF DESCRIPTION OF THE DRAWINGS

The invention will now be illustrated with examples given as an indication, and non-limiting examples, and with reference to the appended Figures wherein.

DETAILED DESCRIPTION

Figure 1:
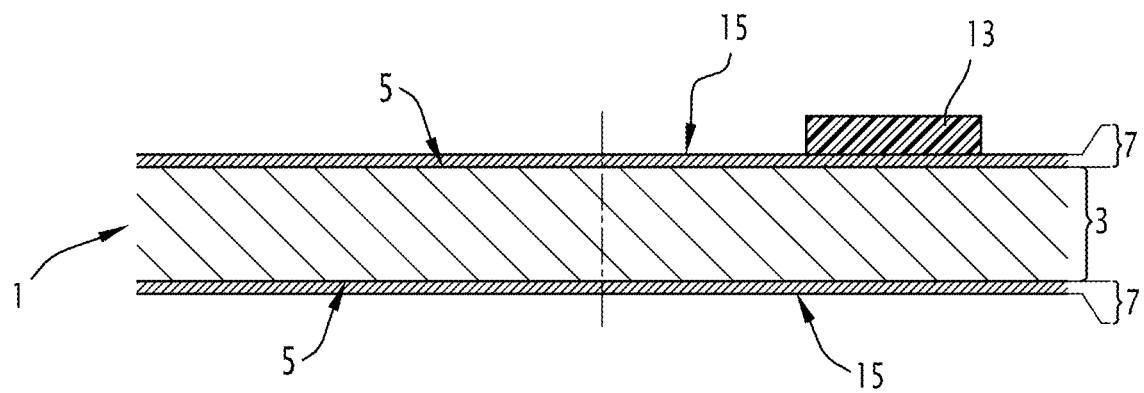
FIG. 1 is a schematic sectional view illustrating the structure of a metal sheet 1 obtained by a method according to the invention.

The metal sheet 1 of FIG. 1 comprises a steel substrate 3 covered on each of both of its faces 5 with a metal coating 7. It will be observed that the thicknesses relative to the substrate 3 and coatings 7 covering it have not been observed in FIG. 1 in order to facilitate the illustration.

The coatings 7 present on both faces 5 are similar and only one will be described in detail subsequently. Alternatively (not shown), only one of the faces 5 has a metal coating 7.

The metal coating 7 comprises more than 40% by weight of zinc, notably more than 50% by weight of zinc, preferably more than 70% by weight of zinc, more preferentially more than 90%, preferably more than 95%, preferably more than 99%. The remainder may consist of metal elements Al, Mg, Si, Fe, Sb, Pb, Ti, Ca, Sr, Mn, Sn, La, Ce, Cr, Ni or Bi, taken alone or as a combination. The measurement of the composition of a coating is generally achieved by chemical dissolution of the coating. The given result corresponds to an average content in the whole of the layer.

The metal coating 7 may comprise several successive layers of different compositions, each of these layers comprising more than 40% by weight of zinc (or more, as defined above). The metal coating 7 or one of its constitutive layers, may also have a concentration gradient in one given metal element. When the metal coating 7, or one of its constitutive layers, has a concentration gradient of zinc, the average proportion of zinc in the metal coating 7, or in this constitutive layer, is further more than 40% by weight of zinc (or more, as defined above).

For making the metal sheet 1, it is for example possible to proceed as follows.

The method may comprise a preliminary step for preparing the steel substrate 3 having two faces 5, at least one of which is coated with a metal coating 7 comprising at least 40% by weight of zinc. A steel substrate 3 obtained for example by hot and then cold rolling is used. The metal coating 7 comprising more than 40% by weight of zinc may be deposited on the substrate 3 by any deposition method, notably by electro-zinc-plating, a physical vapor deposition (PVD), a jet vapor deposition (JVD) or hot dip galvanization.

According to a first alternative, the steel substrate 3 having two faces 5, at least one of which is coated with a metal coating 7 comprising at least 40% by weight of zinc is obtained by electro-zinc-plating of the steel substrate 3. The application of the coating may take place on one face (the metal sheet 1 then only comprising a metal coating 7), or on both faces (the metal sheet 1 then comprises two metal coatings 7).

According to a second alternative, the steel substrate 3 having two faces 5, at least one of which is coated with a metal coating 7 comprising at least 40% by weight of zinc is obtained by hot galvanization of the steel substrate 3.

According to a third alternative, the steel substrate 3 having two faces 5, at least one of which is coated with a metal coating 7 comprising at least 40% by weight of zinc is obtained equally by electro-zinc-plating of the steel substrate 3 or by hot galvanization of the steel substrate 3.

Generally, the substrate 3 is then in the form of a strip which one runs in a bath for depositing the metal coating 7 by hot dipping. The composition of the bath varies according to whether the desired metal sheet 1 is a galvanized steel sheet GI, GA (alloyed galvanized sheet or "galvannealed steel sheet") or a metal sheet coated with a zinc and magnesium alloy, an alloy of zinc and aluminum or an alloy of zinc, magnesium and aluminum. The bath may also contain up to 0.3% by weight of additional optional elements such as Si, Sb, Pb, Ti, Ca, Mn, Sn, La, Ce, Cr, Ni or Bi. These different additional elements may notably give the possibility of improving the ductility or the adhesion of the metal coating 7 on the substrate 3. One skilled in the art, which is aware of their effects on the characteristics of the metal coating 7, will know how to use them depending on the sought complementary object. The bath may finally contain residual elements from the supply ingots, or resulting from the passage of the substrate 3 in the bath, a source of inevitable impurities in the metal coating 7.

In an embodiment, the steel substrate 3 having two faces 5, at least one of which is coated with a metal coating 7 comprising at least 40% by weight of zinc, is a galvanized steel sheet GI. The metal coating 7 is then a zinc coating GI. Such a coating comprises more than 99% by weight of zinc.

In another embodiment, the steel substrate 3 having two faces 5, at least one of which is coated with a metal coating 7 comprising at least 40% by weight of zinc is a galvanized steel sheet GA. The metal coating 7 is then a zinc coating GA. A galvanized steel sheet GA is obtained by annealing of a galvanized steel sheet GI. In this case, the method therefore comprises a hot galvanization step of the steel substrate 3, and then an annealing step. The annealing causes diffusion of the iron of the steel substrate 3 into the metal coating 7. The metal coating 7 of a GA sheet typically comprises from 10% to 15% by weight of iron.

In another embodiment, the metal coating 7 is an alloy of zinc and of aluminum. The metal coating 7 may for example comprise 55% by weight of aluminum, 43.5% by weight of zinc and 1.5% by weight of silicone, like Aluzinc® marketed by ArcelorMittal.

In another embodiment, the metal coating 7 is an alloy of zinc and magnesium, preferably comprising more than 70% by weight of zinc. The metal coatings comprising zinc and magnesium will globally be referred to here under the term of zinc-magnesium or ZnMg coatings. The addition of magnesium to the metal coating 7 clearly increases the resistance to corrosion of these coatings, which may give the possibility of reducing their thickness or of increasing the protection guarantee against corrosion over time.

The metal coating 7 may notably be an alloy of zinc, magnesium and aluminum, preferably comprising more than 70% by weight of zinc. The metal coatings comprising zinc, magnesium and aluminum will globally be referred to here under the term of zinc-aluminum-magnesium or ZnAlMg coatings. The addition of aluminum (typically of the order of 0.1% by weight) to a coating based on zinc and magnesium also gives the possibility of improving the resistance to corrosion, and makes the coated sheet easier to be shaped. Thus, the metal coatings essentially comprising zinc are presently in competition with coatings comprising zinc, magnesium and optionally aluminum.

Typically, the metal coating 7 of the ZnMg or ZnAlMg type comprised between 0.1 and 10% by weight, typically between 0.3 and 10% by weight, notably between 0.3 and 4% by weight of magnesium. Below 0.1% by weight of Mg, the coated sheet does not resist as well to corrosion and beyond 10% by weight of Mg, the ZnMg or ZnAlMg coating oxidizes too much and cannot be used.

In the sense of the present application, when a range of Figures is described as being between a low limit and an upper limit, it is understood that these limits are included. For example a coating comprising 0.1% or 10% by weight of magnesium is included when the expression "The metal coating 7 comprises between 0.1 and 10% by weight of magnesium" is used.

The metal coating 7 of the ZnAlMg type comprises aluminum, typically between 0.5 and 11% by weight, notably between 0.7 and 6% by weight, preferably between 1 and 6% by weight of aluminum. Typically, the mass ratio between the magnesium and the aluminum in the metal coating 7 of the ZnAlMg type is strictly less than or equal to 1, preferably strictly less than 1, and preferably further strictly less than 0.9.

The most common inevitable impurity present in the metal coating 7 and resulting from the passing of the substrate in the bath is iron which may be present at a content ranging up to 3% by weight, generally of less than or equal to 0.4% by weight, typically comprised between 0.1 and 0.4% by weight relatively to the metal coating 7.

The inevitable impurities from the supply ingots, for ZnAlMg baths, are generally lead (Pb), present at a content of less than 0.01% by weight based on the metal coating 7, cadmium (Cd), present at a content of less than 0.005% by weight relatively to the metal coating 7 and tin (Sn), present at a content of less than 0.001% by weight based on the metal coating 7.

Additional elements selected from among Si, Sb, Pb, Ti, Ca, Mn, Sn, La, Ce, Cr, Ni or Bi may be present in the metal coating 7. The weight content of each additional element is generally less than 0.3%.

The metal coating 7 generally has a thickness of less than or equal to 25 µm and conventionally aims at protecting the steel substrate 3 against corrosion.

After depositing the metal coating 7, the substrate 3 is for example wrung by means of nozzles projecting gas on either side of the substrate 3.

The metal coating 7 is then left to cool in a controlled way so that it solidifies. The controlled cooling of the metal coating 7 is ensured at a rate preferably greater than or equal to 15° C./s or further greater than 20° C./s between the beginning of the solidification (i.e. when the metal coating 7 falls just under the temperature of the liquidus) and the end of solidification (i.e. when the metal coating 7 attains the temperature of the solidus).

Alternatively, the wringing may be adapted for removing the metal coating 7 deposited on one face 5 so that only one of the faces 5 of the metal sheet 1 is definitively coated with a metal coating 7.

The thereby treated strip may then be subject to a so called skin-pass step which gives the possibility of work hardening it and of giving it a roughness facilitating its subsequent shaping.

The outer surface 15 of the metal coating 7 is subject to a surface treatment step which consists of applying to them an aqueous solution comprising an amino acid selected from among alanine, arginine, aspartic acid, glutamic acid, cysteine, glycine, lysine, methionine, proline, threonine, valine, and a mixture thereof. Each amino acid may be in a neutral or salt form. In the sense of the application, an amino acid is one of the 22 protein-generating amino acids (isomer L) or one of their isomers, notably their isomers D. The amino acid is preferably an L amino acid for reasons of cost.

The invention is based on the unexpected discovery that the application on the outer surface 15 of the metal coating 7 of an aqueous solution comprising an amino acid from the list defined above gives the possibility of improving the adhesion of an adhesive on the obtained coated metal sheet. This improvement is not observed regardless of the amino acid used. For example, the adhesion of an adhesive was not improved by applying glutamine or serine on a coated sheet with a metal coating 7 comprising at least 40% by weight of zinc. For the moment no theory has been put forward for explaining why certain amino acids allow improvement in the adhesion of an adhesive and not other ones.

The aqueous solution applied may comprise an amino acid selected from among alanine, arginine, aspartic acid, glutamic acid, glycine, lysine, methionine, proline, threonine, valine, and a mixture thereof, each amino acid being in a neutral or salt form.

The applied aqueous solution may comprise an amino acid selected from among alanine, aspartic acid, glutamic acid, cysteine, glycine, methionine, proline, threonine, valine, and a mixture thereof, each amino acid being in a neutral or salt form.

The applied aqueous solution may comprise an amino acid selected from among alanine, aspartic acid, glutamic acid, cysteine, methionine, proline, threonine and valine, and a mixture thereof, each amino acid being in a neutral or salt form.

The applied aqueous solution may comprise an amino acid selected from among alanine, aspartic acid, glutamic acid, methionine, proline, threonine and valine, and a mixture thereof, each amino acid being in a neutral or salt form.

Preferably, in the first alternative wherein the metal sheet 1 is an electro-zinc-plated steel sheet, the amino acid of the applied aqueous solution is selected from among aspartic acid, glutamic acid, cysteine, methionine, proline and threonine, and a mixture thereof, each amino acid being in a neutral or salt form, in particular from among aspartic acid, glutamic acid, methionine, proline and threonine, and a mixture thereof, each amino acid being in a neutral or salt form.

Preferably, in the second alternative wherein the metal sheet 1 is a sheet obtained by hot galvanization of the steel substrate 3, the amino acid of the applied aqueous solution is selected from among alanine, glutamic acid, proline, threonine and valine, and a mixture thereof, each amino acid being in a neutral or salt form.

Preferably, in the third alternative wherein the metal sheet 1 is equally a sheet in electro-zinc-plated steel or a metal sheet obtained by hot galvanization of the steel substrate 3, the amino acid of the applied aqueous solution is selected from among glutamic acid, proline, threonine and a mixture thereof, each amino acid being in a neutral or salt form.

The amino acid is notably selected from among proline in a neutral or salt form, cysteine in a neutral or salt form, and from a mixture thereof. Proline is particularly efficient for improving the adhesion of the adhesive. Cysteine advantageously gives the possibility of metering the amino acid amount deposited at the surface by means of its thiol function, for example by X fluorescence spectrometry (XFS).

Preferably, the amino acid is selected from proline in a neutral or salt form, threonine in a neutral or salt form, and a mixture thereof. Proline and threonine actually give the possibility of not only improving the compatibility of the surface of the metal sheet with an adhesive, but also improving the resistance to corrosion of the metal sheet and the tribological properties of the surface of the metal sheet (which makes it well adapted to its subsequent shaping, notably by drawing).

The improvement of resistance to corrosion may for example be shown by carrying out tests according to the ISO 6270-2 2005 standards and/or VDA 230-213 2008 standards, and the improvement of the tribological properties may for example be shown by measuring the friction coefficient ($\mu$) according to the contact pressure (MPa), for example from 0 to 80 MPa.

It is particularly surprising that threonine and/or proline give the possibility of improving both of these three properties at a time. Under the tested conditions, the other amino acids did not give the possibility of improvement of these three properties on any type of metal coating comprising at least 40% by weight of zinc (at best, the other amino acids gave the possibility of observing an improvement in two of these properties, but not of the three).

The applied aqueous solution generally comprises from 1 to 200 g/L, notably from 5 g/L to 150 g/L, typically from 5 g/L to 100 g/L, for example from 10 to 50 g/L of amino acid in the neutral or salt form or of a mixture of amino acids in neutral or salt forms. The most significant improvement of the compatibility of the metal coating 7 of the sheet 1 with the adhesive 13 was observed by using an aqueous solution comprising from 5 g/L to 100 g/L, in particular from 10 to 50 g/L of amino acid or of a mixture of amino acid.

The applied aqueous solution generally comprises from 10 to 1750 mmol/L, notably from 40 mmol/L to 1,300 mmol/L, typically from 40 mmol/L to 870 mmol/L, for example from 90 to 430 mmol/L of amino acid in the neutral or salt form or of a mixture of amino acids in the neutral or salt forms. The most significant improvement in the compatibility of the metal coating 7 of the sheet 1 with the adhesive 13 was observed by using an aqueous solution comprising from 40 mmol/L to 870 mmol/L, in particular from 90 to 430 mmol/L of amino acid or of a mixture of amino acids.

Of course, the mass and molar proportions of the amino acid (or of each of the amino acids when a mixture of amino acids is used) in the aqueous solution cannot be greater than the proportions corresponding to the solubility limit of the amino acid at the temperature at which the aqueous solution is applied.

Generally, the mass percentage as dry extract of the amino acid in neutral or salt form or of the mixture of amino acids in the neutral or salt forms in the aqueous solution is greater than or equal to 50%, notably greater than or equal to 65%, typically greater than or equal to 75%, notably greater than or equal to 90%, preferably greater than or equal to 95%. Also, generally, the molar percentage as dry extract of the amino acid in the neutral or salt form in the aqueous solution is greater than or equal to 50%, typically greater than or equal to 75%, notably greater than or equal to 90%, preferably greater than or equal to 95%.

The aqueous solution may comprise zinc sulfate and/or iron sulfate. The proportion of zinc sulfate in the aqueous solution is generally less than 80 g/L, preferably less than 40 g/L. Preferably, the aqueous solution is free of zinc sulfate and iron sulfate. Generally, the aqueous solution comprising an amino acid comprises less than 10 g/L, typically less than 1 g/L, generally less than 0.1 g/L, notably less than 0.05 g/L, for example less than 0.01 g/L of zinc ions. Preferably, the aqueous solution is free of zinc ion (in addition to inevitable trace amounts, which may for example stem from the pollution, by the substrate, of the bath of the aqueous solution).

The aqueous solution comprising an amino acid generally comprises less than 0.005 g/L of iron ions. The aqueous solution comprising an amino acid generally comprises very little metal ions other than potassium, sodium, calcium and zinc, typically less than 0.1 g/L, notably less than 0.05 g/L, for example less than 0.01 g/L, preferably less than 0.005 g/L of metal ions other than potassium, sodium, calcium and zinc. Typically, the aqueous solution is free of metal ions other than zinc, sodium, calcium and potassium. The aqueous solution comprising an amino acid generally comprises very little metal ions other than zinc, typically less than 0.1 g/L, notably less than 0.05 g/L, for example less than 0.01 g/L, preferably less than 0.005 g/L of metal ions other than zinc. Typically, the aqueous solution is free of metal ions other than zinc. In particular, the aqueous solution comprising an amino acid generally comprises very little cobalt and/or nickel ions, typically less than 0.1 g/L, notably less than 0.05 g/L, for example less than 0.01 g/L of cobalt and/or nickel ions. Preferably, the aqueous solution is free of cobalt ions and/or free of nickel ions and/or free of copper ions and/or free of chromium ions. The aqueous solution is free of compound comprising a metal from the group IIIB (Sc, Y, La, Ac) or from the group IVB (Ti, Zr, Hf, Rf). Preferably, it is free of metal ions (in addition to inevitable metal impurities, which may for example stem from pollution, by the substrate, from the bath of the aqueous solution).

Generally, the absence of metal ions in the aqueous solution gives the possibility of avoiding perturbation of the action of the active ingredient which is the amino acid or the mixture of amino acids.

Further, the aqueous solution comprising an amino acid generally comprises less than 0.1 g/L, notably less than 0.05 g/L, for example less than 0.01 g/L of compounds comprising chromium VI, or more generally chromium. Generally, it is free of compounds comprising chromium VI, or more generally chromium.

Moreover, the aqueous solution is generally free of oxidizing agent.

Moreover, the aqueous solution is generally free of resin, in particular no organic resin. A resin refers to a polymer product (either natural, artificial or synthetic) which is a raw material for, for example making plastic materials, textiles, paints (liquids or powdery), adhesives, varnishes, polymer foams. It may be thermoplastic or thermosetting. Generally, the aqueous solution is generally free of polymer.

The absence of resin gives the possibility of obtaining a treatment layer of a small thickness and of thereby facilitating its removal during the degreasing preceding the phosphating and the painting. A resin has, under these conditions, a tendency to leave residues which perturb the phosphating.

The pH of the applied aqueous solution is generally comprised from a pH equal to (isoelectric point of the amino acid−3) to a pH equal to the (isoelectric point of the amino acid+3), notably a pH equal to the (isoelectric point of the amino acid−2) to a pH equal to the (isoelectric point of the amino acid+2), preferably from a pH equal to the (isoelectric point of the amino acid−1) to a pH equal to the (isoelectric point of the amino acid+1). For example, when the amino acid is proline, the isoelectric point of which is 6.3, the pH of the aqueous solution is generally from 3.3 to 9.3, notably from 4.3 to 8.3, preferably from 5.3 to 7.3.

The pH of the applied aqueous solution is generally comprised from a pH equal to the (isoelectric point of the amino acid−3) to a pH equal to the (isoelectric point of the amino acid+1), preferably from a pH equal to the (isoelectric point of the amino acid−3) to a pH equal to the (isoelectric point of the amino acid−1), notably from a pH equal to the (isoelectric point of the amino acid−2.5) to a pH equal to the (isoelectric point of the amino acid−1.5), typically a pH equal to the (isoelectric point of the amino acid−2). For example, when the amino acid is proline, the isoelectric point of which is 6.3, the pH of the aqueous solution is preferably from 3.3 to 5.3, notably from 3.8 to 4.8, typically of the order of 4.0, like 4.3. Such a pH gives actually the possibility of promoting the bond between the amino acid and the metal coating 7. In particular, a method applied with a solution having such a pH gives the possibility of obtaining a metal sheet which retains its compatibility properties with improved adhesives, even when it has undergone a washing/re-oiling treatment. Generally, once the metal sheet according to the invention has been prepared, it may be cut out as a blank before its shaping, notably by drawing. In order to remove the impurities deposited on the metal sheet from this cutting out, a washing/re-oiling treatment may be applied. The latter consists of applying on the surfaces of the metal sheet a low viscosity oil, and then of brushing, and then applying an oil with a larger viscosity. Without intending to be bound by a particular theory, it is assumed that a solution having such a pH gives the possibility of obtaining the amino acid in a protonated form ($NH_3^+$), which promotes the bond between the amino acid and the metal coating 7 and therefore the maintaining of the amino acid at the surface in spite of the washing/re-oiling treatment. At different pH's and notably greater than the (isoelectric point of the amino acid−1), the amine of the amino acid is not very or not protonated: The bonds between the amino acid and the metal coating 7 will be less strong and the amino acid will have more tendency to dissolve in the oil used during the washing/re-oiling treatment, leading to its at least partial removal, and therefore to not as good compatibility properties of the metal sheet having been subject to such a treatment with the adhesives.

One skilled in the art knows how to adapt the pH of the aqueous solution, by adding a base if he/she wishes to increase the pH, or of an acid, such as phosphoric acid, if he/she wishes to reduce it.

In the sense of the application, a base or an acid is equally in a neutral and/or salt form. Generally, the acid proportion is less than 10 g/L, notably 1 g/L in the solution. Preferably, phosphoric acid is added together in a neutral form and in a salt form (for example of sodium, calcium or further potassium) for example in a $H_3PO_4/NaH_2PO_4$ mixture. The phosphoric acid advantageously gives the possibility of dosing the amount of aqueous solution (and therefore of amino acid) deposited at the surface by means of the phosphorus and/or sodium, for example by X fluorescence spectrometry (XFS).

In an embodiment, the aqueous solution consists in a mixture of water, of amino acid in a neutral or salt form or a mixture of amino acids independently in neutral or salt forms and optionally with a base or a mixture of bases, or an acid or a mixture of acids. The base or the acid is used for adapting the pH of the aqueous solution. The amino acid gives the improved compatibility properties with the adhesives. The base or the acid gives the possibility of reinforcing this effect. The addition of other compounds is not necessary.

In the method according to the invention, the aqueous solution comprising an amino acid may be applied at a temperature comprised between 20 and 70° C. The period of application of the aqueous solution may be between 0.5 s and 40 s, preferably between 2 s and 20 s.

The aqueous solution comprising an amino acid may be applied by immersion, spraying or by any other system.

The application of the aqueous solution on the outer surface 15 of the metal coating 7 may be carried out by any means, for example by immersion, by spraying or by roll coating. This latter technique is preferred since it gives the possibility of more easily controlling the amount of aqueous solution applied while ensuring a homogeneous distribution of the aqueous solution on the surface. Generally, the thickness of humid film consisting of the aqueous solution applied on the outer surface 15 of the metal coating 7 is from 0.2 to 5 µm, typically between 1 and 3 µm.

By «application on the outer surface 15 of the metal coating 7 of an aqueous solution comprising an amino acid", is meant that the aqueous solution comprising an amino acid is put into contact with the outer surface 15 of the metal coating 7. It is therefore understood that the outer surface 15 of the metal coating 7 is not covered with an intermediate layer (a film, a coating or a solution) which would prevent the putting into contact of the aqueous solution comprising an amino acid with the outer surface 15 of the metal coating 7.

Typically, the method comprises, after the step for applying on the outer surface 15 of the metal coating 7 of an aqueous solution comprising an amino acid, a drying step, which gives the possibility of obtaining on the outer surface 15 of the metal coating 7 a layer comprising (or consisting of) an amino acid (in a neutral or salt form) or a mixture of amino acids (independently in neutral or salt forms). The latter may be carried out by subjecting the metal sheet 1 to a temperature comprised between 70 and 120° C., for example between 80 and 100° C., generally for 1 to 30 seconds, notably 1 to 10 seconds, for example 2 s. In particular, a method applied with such a pH step gives the possibility of obtaining a metal sheet which retains its improved compatibility properties with adhesives, even when it has been subject to a washing/re-oiling treatment.

The metal coating 7 of the obtained metal sheet 1 is then typically coated with a layer comprising from 0.1 to 200 mg/m², notably from 25 to 150 mg/m², in particular from 50 to 100 mg/m², for example from 60 to 70 mg/m² of amino acid (in neutral or salt form) or of a mixture of amino acids (independently in neutral and/or salt forms). The amount of amino acid deposited on the outer surface 15 of the metal coating 7 may be determined by dosing the amount of deposited amino acid (for example by infrared), or else by dosing the amount of remaining amino acid in the aqueous solution (for example by acid-base dosage and/or with conductimetry), it being given that the initial concentration of amino acid of the aqueous solution is known. Further, when the amino acid or one of the amino acids is cysteine, the amount of cysteine deposited at the surface may be determined by X fluorescence spectrometry (XFS).

Generally, the layer comprising an amino acid (in neutral or salt form) or a mixture of amino acids (independently in neutral or salt forms) which coat the metal coating 7 of the obtained metal sheet 1 comprises from 50 to 100% by weight, notably from 75 to 100% by weight, typically from 90 to 100% by weight of amino acid (in neutral or salt form) or of a mixture of amino acids (independently in neutral or salt forms).

The method may comprise (or be free of) other surface treatment step(s) than the one consisting of applying an aqueous solution comprising an amino acid (for example a surface treatment by alkaline oxidation and/or a treatment of chemical conversion). When this(these) surface treatment step(s) lead to the formation of a layer on the metal coating 7, this(these) other surface treatment step(s) is(are) carried out simultaneously or after the step for applying an aqueous solution comprising an amino acid on the outer surface 15 of the metal coating 7, so that there is no intermediate layer between the outer surface 15 of the metal coating 7 and the aqueous solution comprising an amino acid. These optional aforementioned surface treatment steps may comprise other rinsing, drying sub-steps . . . .

After having applied the aqueous solution comprising an amino acid, a film of grease or oil is generally applied on the outer surface 15 of the metal coating 7 coated with a layer comprising an amino acid or a mixture of amino acids in order to protect it against corrosion.

The strip may optionally be wound before being stored. Typically before shaping the part, the strip is cut out. A film of grease or oil may then be again applied on the outer surface 15 of the metal coating 7 coated with a layer comprising an amino acid or a mixture of amino acids before the shaping.

Preferably, the method is free of degreasing step (typically carried out by applying a basic aqueous solution with a pH generally greater than 9 on the outer surface 15 of the metal coating 7) before shaping and before applying an adhesive. Indeed, the oil or the grease present on the outer surface 15 of the metal coating 7 will generally be absorbed by the adhesive which will be applied subsequently and is therefore not a nuisance. Further, the treatment with a basic aqueous solution on the outer surface 15 of the metal coating 7 coated with a layer comprising an amino acid or a mixture of amino acids may lead to partial or total removal of the amino acid(s) which has(have) been deposited on the outer surface 15 of the metal coating 7, which one tries to avoid.

The metal sheet may then be shaped by any method adapted to the structure and to the shape of the parts to be manufactured, preferably by drawing, such as for example cold drawing. The shaped metal sheet 1 then corresponds to a part, for example an automobile part.

As schematically illustrated in FIG. 1, an adhesive 13 may be applied locally on at least one outer surface 15 of a metal coating 7 on which has been applied at least one of the aforementioned amino acids for notably giving the possibility of assembling the metal sheet 1 to another metal sheet and thereby form a portion of an automobile vehicle for example. The adhesive 13 may be any type of adhesive or sealant used conventionally in the automotive industry. These adhesives may be structural adhesives, reinforced structural adhesives (for example of the "crash" type) or semi-structural adhesive, sealants or further adjustment sealants which are of various chemical natures, such as epoxy, polyurethane or rubber.

Once the metal sheet 1 has been assembled with another metal sheet via the adhesive 13, the method may then comprise (or be free of):

a degreasing step, typically achieved by applying a basic aqueous solution on the outer surface 15 of the metal coating 7, and/or other surface treatment step(s), for example a phosphating step, and/or a cataphoresis step.

The invention also relates to the metal sheet 1 which may be obtained by the method. Such a metal sheet comprises at least one portion of at least one outer surface 15 of the metal coating 7 coated with a layer comprising from 0.1 to 200 mg/m$^2$, notably from 25 to 150 mg/m$^2$, in particular from 50 to 100 mg/m$^2$, for example from 60 to 70 mg/m$^2$ of amino acid in a neutral or salt form.

Preferably, an adhesive 13 is locally present on at least one outer surface 15 of a metal coating 7 coated with a layer comprising an amino acid or a mixture of amino acids of the metal sheet 1.

The invention also relates to an assembly comprising:
a first metal sheet 1 as defined above, and
a second metal sheet,
the first metal sheet 1 and the second metal sheet being assembled via the adhesive 13 locally present on at least one outer surface 15 of the metal coating 7 coated with a layer comprising an amino acid or a mixture of amino acids of the first metal sheet 1.

The invention also relates to the use of an aqueous solution comprising an amino acid selected from among alanine, arginine, aspartic acid, glutamic acid, cysteine, glycine, lysine, methionine, proline, threonine, valine, and a mixture thereof, each amino acid being in a neutral or salt form, the aqueous solution being free of compound comprising a metal from the group IIIB or from the group IVB, for improving the compatibility between an adhesive 13 and at least one portion of an outer surface 15 of a metal coating 7 coating at least one face 5 of a steel substrate 3, wherein the metal coating 7 comprises at least 40% by weight of zinc.

The preferential embodiments described above for the aqueous solution, the conditions of application of the aqueous solution, the metal coating 7 are of course applicable.

The invention also relates to a method for improving the compatibility with an adhesive 13, of at least one portion of an outer surface 15 of a metal coating 7 coating at least one face 5 of a steel substrate 3, comprising at least the steps:

providing a steel substrate 3 having two faces 5, at least one of which is coated with a metal coating 7 comprising at least 40% by weight of zinc, applying on the outer surface 15 of the metal coating 7 an aqueous solution comprising an amino acid selected from among alanine, arginine, aspartic acid, glutamic acid, cysteine, glycine, lysine, methionine, proline, threonine, valine, and a mixture thereof, each amino acid being in a neutral or salt form, the aqueous solution being free of compound comprising a metal from the group IIIB or from the group IVB.

The preferential embodiments described above for the aqueous solution, the conditions for applying the aqueous solution, the metal coating 7 and the optional additional steps in the method are of course applicable.

The invention also relates to the use of an aqueous solution comprising an amino acid selected from among proline, threonine and a mixture thereof, the proline and the threonine being independently in a neutral or salt form, the aqueous solution being free of compound comprising a metal from the group IIIB or from the group IVB, for:

improving the compatibility with an adhesive 13, of at least one portion of an outer surface 15 of a metal coating 7 coating at least one face 5 of a steel substrate 3, improving resistance to corrosion of the outer surface 15 of the metal coating 7 coating at least one face 5 of the steel substrate 3, and improving the tribological properties of the outer surface 15 of the metal coating 7 coating at least one face 5 of the steel substrate 3, wherein the metal coating 7 comprises at least 40% by weight of zinc.

The preferential embodiments described above for the aqueous solution, the conditions for applying the aqueous solution and the metal coating 7 are of course applicable.

The invention also relates to a method for:

improving the compatibility, with an adhesive 13, of at least one portion of an outer surface 15 of a metal coating 7 coating at least one face 5 of a steel substrate 3, improving the resistance to corrosion of the outer surface 15 of the metal coating 7 coating at least one face 5 of the steel substrate 3, and improving the tribological properties of the outer surface 15 of the metal coating 7 coating at least one face 5 of the steel substrate 3, said method comprising at least the steps:

providing a steel substrate 3 having two faces 5, at least one of which is coated with a metal coating 7 comprising at least 40% by weight of zinc, applying on the outer surface 15 of the metal coating 7 an aqueous solution comprising an amino acid selected from among proline, threonine and a mixture thereof, the proline and the threonine being independently in a neutral or salt form, the aqueous solution being free of compound comprising a metal from the group IIIB or from the group IVB.

The preferential embodiments described above for the aqueous solution, the conditions for applying the aqueous solution, the metal coating 7 and the optional additional steps in the method are of course applicable.

Example 1: Traction Tests

In order to illustrate the invention, tensile tests were carried out and are described as non-limiting examples.

Samples of steel sheets 1 covered with a metal coating 7 comprising about 99% of zinc (steel sheet GI), or else samples of metal sheets 1 in electro-zinc-plated steel comprising 100% of zinc (steel sheet EG) were used.

Figure 2:
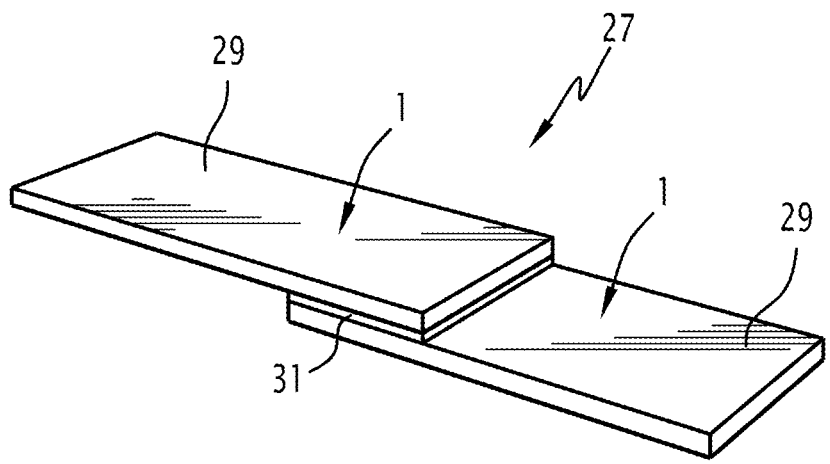
FIG. 2 is a schematic view illustrating a specimen used for a tensile test, or an assembly according to the invention.
Figure 3:
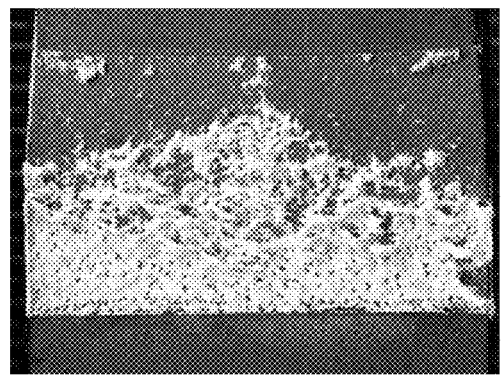
FIGS. 3 and 4 are photographs respectively showing a surface cohesive breakage and an adhesive breakage.
Figure 4:
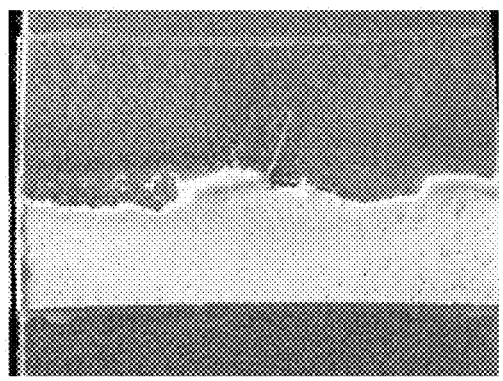

As illustrated by FIG. 2, each specimen 27 was prepared in the following way. Tabs 29 were cut out in the metal sheet 1 to be evaluated. These tabs 29 had dimensions of 25 mm×12.5 mm×0.2 mm.

The tabs 29 were immersed for an immersion period of 20 s at a temperature of 50° C. in an aqueous solution of amino acid the pH of which had been adjusted by adding $H_3PO_4$, except for the reference metal sheets (Ref) not having been subject to any treatment with an amino acid.

Fuchs® 3802-39S oil was applied on the tabs 29 in an amount of 3 g/m².

Two tabs 29 were adhesively bonded with a joint 31 of adhesive BM1496V, BM1440G or BM1044, which are so called "crash" adhesives based on epoxy and marketed by Dow® Automotive. These adhesives were selected since these are adhesives conventionally leading to adhesive breakages before ageing and/or after ageing of the adhesive.

The thereby formed specimen 27 was then brought to 180° C. and maintained at this temperature for 30 minutes, which allows baking of the adhesive.

Ageing tests were carried out with the specimens 27, the tabs 29 of which have been adhesively bonded with the adhesive BM1044. The natural ageing of the adhesive is simulated by ageing with a humid cataplasm at 70° C. for 7 or 14 days.

The tensile test was then carried out at a room temperature of 23° C. by imposing a traction speed of 10 mm/min to a tab 29, parallel to the latter, while the other tab 29 of the specimen 27 was fixed. The test was continued until breakage of the specimen 27.

At the end of the test, the maximum tensile stress was noted and the nature of the breakage was evaluated visually.

In table 1, are grouped the results on the metal sheet GI.

In table 2, are grouped the results on an electro-zinc-plated metal sheet (EG).

SCB means surface cohesive breakage.

As illustrated by tables 1 and 2 above, the metal sheets 1 which had undergone a treatment with an aqueous solution comprising an amino acid as defined above promote the occurrence of surface cohesive breakages unlike the reference metal sheets for which more adhesive breakages were observed.

In particular, on the GI metal sheets (table 1):

with the adhesive BM1496V, the breakage facets observed on tests 1 to 5B according to the invention exclusively consist of surface cohesive breakage, unlike the reference which has not been subject to treatment (Ref 1) where 30% of adhesive breakage was ascertained. As a counter example, the metal sheets 1 which had been subject to a treatment with an aqueous solution comprising serine or glutamine (tests CE1 and CE2) had a degraded breakage facet relatively to the reference Ref 1 itself, the breakage being in a high majority adhesive.

With the adhesive BM1440G, the observed breakage facets on the tests according to the invention are also exclusively formed with a surface cohesive breakage, unlike the reference not having been subject to a treatment (Ref 2) where 20% of adhesive breakage is ascertained, With the adhesive BM1044, it is observed that the adhesion of the adhesive on the metal sheets according to the invention (tests 7A to 7C) better ages than in the reference, after 7 and 14 days of humid cataplasm.

In particular, on the electro-zinc-plated sheets (table 2):

with the adhesive BM1496V, the breakage facets observed on tests 8A to 9B according to the invention, consist in majority of surface cohesive breakage, unlike the reference which did not undergo any treatment (Ref 6) where 40% of adhesive breakage is ascertained, With the adhesive BM1044, it is observed that the adhesion of the adhesive on the metal sheets according to the invention (tests 10A-10B) ages better than in reference (Ref 7-Ref 8), after 7 days of humid cataplasm. As a counter-example, the metal sheets 1 which underwent a treatment with an aqueous solution comprising serine or glutamine (tests CE3 to CE5) have a degraded breakage facet relatively to the actual reference, the breakage being in majority adhesive.

The other properties of the metal sheets 1 obtained by the method according to the invention (mechanical properties, compatibility with one of the subsequent step(s) of cataphoresis and/or phosphating and/or painting) were not degraded.

TABLE 1

Maximum tensile stresses and natures of the fracture for the specimens based on tested metal sheets GI.

| Test no. | Adhesive | Amino acid | Concentration g/L | pH | Ageing (days) | Max stress MPa | Fracture surface (FS) |
|---|---|---|---|---|---|---|---|
| 1 | BM1496V | Glutamic acid | 0.01 | Natural | NA | 18.0 | 80% |
| 2A | | L-Proline | 20 | 4 | NA | 17.8 | 100% |
| 2B | | | 50 | | | 16.8 | 100% |
| 2C | | | 100 | | | 15.1 | 100% |
| 2D | | | 150 | | | 14.4 | 100% |
| 3A | | L-Alanine | 20 | 4 | NA | 17.2 | 100% |
| 3B | | | 50 | | | 15.7 | 100% |
| 3C | | | 100 | | | 15.3 | 100% |
| 3D | | | 150 | | | 13.1 | 100% |
| 4A | | L-Threonine | 20 | 4 | NA | 16.8 | 100% |
| 4B | | | 50 | | | 15.9 | 100% |
| 4C | | | 80 | | | 15 | 100% |
| 4D | | | 100 | | | 14.8 | 100% |
| 5A | | L-Valine | 20 | 4 | NA | 17 | 100% |
| 5B | | | 50 | | | | 17.1 | 100% |
| Ref 1 | | NA | NA | NA | NA | 17.9 | 70% |
| CE1 | | L-Glutamine | 20 | Natural | NA | 17.6 | 5% |
| CE2 | | L-Serine | 20 | Natural | NA | 15.4 | 0% |
| 6 | BM1440G | L-Proline | 50 | Natural | NA | 14.5 | 100% |
| Ref 2 | | NA | NA | NA | NA | 14.9 | 80% |
| 7A | BM1044 | L-Proline | 50 | Natural | NA | 10.6 | 100% |
| 7B | | | | | 7 | 11.5 | 100% |
| 7C | | | | | 14 | 11.3 | 90% |
| Ref 3 | | NA | NA | NA | NA | 11.8 | 100% |
| Ref 4 | | | | | 7 | 12 | 80% |
| Ref 5 | | | | | 14 | 11.5 | 60% |

TABLE 2

Maximum tensile stresses and natures of the fracture for the specimens based on tested electro-zinc-plated sheets.

| Test no. | Adhesive | Amino acid | Concentration (g/L) | pH | Ageing (days) | Max stress (Mpa) | Fracture surface (FS) |
|---|---|---|---|---|---|---|---|
| 8A | BM1496V | L-Cysteine | 20 | Natural | NA | 14.2 | 80% |
| 8B | | | 50 | | | 12.9 | 95% |
| 9A | | L-Proline | 20 | Natural | NA | 12.2 | 95% |
| 9B | | | 50 | | | 10 | 100% |
| Ref 6 | | NA | NA | NA | NA | 14.6 | 60% |
| 10A | BM1044 | L-Cysteine | 30 | Natural | NA | 14.2 | 100% |
| 10B | | | | | 7 | 12 | 100% |
| Ref 7 | | NA | NA | NA | NA | 16.2 | 100% |
| Ref 8 | | | | | 7 | 13.5 | 80% |
| CE3 | | L-Glutamine | 20 | Natural | 7 | 13.1 | 50% |
| CE4 | | L-Serine | 20 | Natural | 7 | 9 | 40% |
| CE5 | | | 50 | | | 5.8 | 10% |

Example 2: Test for Measuring the Friction Coefficient (μ) According to the Contact Pressure (MPa) and Tests of Resistance to Corrosion for the Amino Acids Proline and Threonine 2.1. Corrosion Resistance Tests In order to illustrate the invention, corrosion resistance tests were carried out according to the ISO 6270-2 standards of 2005 and/or VDA 230-213 standards of 2008 on steel sheets 1 covered with a metal coating 7 comprising about 99% of zinc (steel sheet GI), or else samples of electro-zinc-plated steel sheets 1 comprising 100% of zinc (steel sheet EG), on which was applied:

an aqueous solution of proline or threonine the pH of which had been optionally adjusted by adding $H_3PO_4$, and then Fuchs® 3802-39S oil in an amount of 3 g/m², and having then been drawn.

It appears that the metal sheets 1 obtained by a method comprising the application of a solution of proline or threonine has better resistance to corrosion.

2.2 Test for Measuring the Friction Coefficient (μ) Versus the Contact Pressure (MPa).

Tests for measuring the friction coefficient (μ) versus the contact pressure (MPa) were carried out and are described as non-limiting examples.

Samples of steel sheets 1 covered with a metal coating 7 comprising about 99% of zinc (steel sheet GI of grade DX56D, thickness 0.7 mm), specimens of electro-zinc-plated steel sheets 1, the coating of which comprised 100% of zinc (EG steel sheet grade DC06, thickness 0.8 mm), samples of electro-zinc-plated Fortiform® steel sheets 1, the coating of which comprised 100% of zinc (7.5 μm on both faces) or else samples of steel sheets 1 coated by sonic jet vapor deposition (Zn JVD), the coating of which comprised 100% of zinc (7.5 μm on both faces) were used.

Samples having dimensions of 450 mm×35 mm×thickness (0.7 mm for GI and 0.8 mm for EG) were cut out in the steel sheets. The samples were immersed for an immersion period of 20 s at a temperature of 50° C. in an aqueous solution of proline or of threonine, the pH of which was optionally adjusted by adding $H_3PO_4$. Fuchs® 3802-39S oil (in an amount of 3 g/m$^2$), Fuchs® 4107S (to the brink) or QUAKER 6130 (to the brink) was applied on one face of the samples.

The friction coefficient ($\mu$) was then measured versus the contact pressure (MPa) by varying the contact pressure from 0 to 80 MPa:
on the sample of the metal sheet treated by the thereby prepared aqueous solution of proline or threonine, and
on a sample of metal sheet coated, not treated with an amino acid (control).

Several test phases were carried out (phases A, B, and C in table 3 below).

As illustrated by the table 3 below, it was observed that the application of an aqueous solution of proline or threonine gives the possibility:
of reducing the friction coefficient relatively to a coated metal sheet not treated with such a solution (control), and/or
of avoiding friction by jerks or grazing ("stick slip"), while at certain pressures, grazing is observed for a metal sheet coated, not treated with such a solution (control),
of retaining a low friction coefficient after heat treatment for degassing.

The invention claimed is:

1. A method for preparing a metal sheet comprising the steps of:
providing a steel substrate, at least one face of the steel substrate being coated with a metal coating comprising at least 40% by weight of zinc;
applying on an outer surface of the metal coating an aqueous solution consisting of a mixture of:
water,
an amino acid selected from the group consisting of: alanine, arginine, aspartic acid, cysteine, lysine, methionine, proline, threonine, valine, each amino acid being in neutral or salt form, and mixtures of said amino acids, each amino acid in the mixture independently in a neutral or salt form, and
optionally of an acid, or a mixture of acids;
the aqueous solution being free of compound comprising a metal from the group IIIB or from the group IVB and comprising less than 0.005 g/L of iron ions; and
a mass percentage as dry extract of the amino acid in neutral or salt form or of the mixture of amino acids in neutral or salt forms in the aqueous solution being greater than or equal to 50%.

TABLE 3

Tribological properties (Observation of grazing and friction coefficient ($\mu$) versus the exerted pressure) for samples of tested metal sheets.

| | | | Applied aqueous solution | | | Pressure (MPa) | | | |
| | | | | | | | Friction coefficient ($\mu$) | | |
| Metal sheet | Oil | | Amino acid (natural) | Concentration of amino acid (g/L) | pH of the aqueous solution | at which grazing is observed | at 40 MPa | at 60 MPa | at 80 MPa |
|---|---|---|---|---|---|---|---|---|---|
| GI | Fuchs 3802-39S | A | None (control) | NA | NA | 21 | 0.180 | 0.190 | 0.200 |
| | | | Proline | 50 | 6.3 | NA | 0.145 | 0.160 | 0.150 |
| | | | | 100 | 6.3 | NA | 0.120 | 0.120 | 0.105 |
| | | | | 150 | 6.3 | NA | 0.110 | 0.105 | 0.105 |
| | | | Threonine | 20 | 5.6 | NA | 0.130 | 0.155 | 0.140 |
| | | | | 50 | 5.6 | NA | 0.110 | 0.110 | 0.100 |
| | | | | 80 | 5.6 | NA | 0.110 | 0.100 | 0.090 |
| | | | | 100 | 5.6 | NA | 0.115 | 0.110 | 0.100 |
| GI | | C | None (control) | NA | NA | 18 | 0.18 | 0.19 | 0.17 |
| | | | Proline | 80 | 4.0* | NA | 0.13 | 0.13 | 0.12 |
| | | | Proline** | 80 | 4.0* | NA | 0.14 | 0.14 | 0.13 |
| EG DC06 | | | None (control) | NA | NA | 43 | 0.170 | 0.200 | 0.190 |
| | | | Proline | 50 | Natural | NA | 0.120 | 0.120 | 0.120 |
| | | | Threonine | 20 | natural | NA | 0.125 | 0.125 | 0.110 |
| EG DC06 | Quaker | | None (control) | NA | NA | 18 | 0.19 | 0.16 | 0.14 |
| | | | Proline | 70 | natural | NA | 0.15 | 0.12 | 0.11 |
| | | | Proline*** | 70 | natural | NA | 0.15 | 0.12 | 0.11 |
| Fortiform | | | None(control) | NA | NA | NA | 0.18 | 0.15 | 0.13 |
| | | | Proline | 70 | natural | NA | 0.13 | 0.12 | 0.11 |
| Zn JVD | Fuchs ® 4107S | A | None(control) | NA | NA | NA | 0.25 | 0.22 | 0.18 |
| | | | Proline | 10 | natural | NA | 0.24 | 0.20 | 0.17 |
| | | | Proline | 20 | natural | NA | 0.20 | 0.17 | 0.14 |
| | | B | None(control) | NA | NA | NA | 0.27 | 0.23 | 0.20 |
| | | | Proline | 10 | natural | NA | 0.24 | 0.20 | 0.17 |
| | | | Proline | 20 | natural | NA | 0.20 | 0.17 | 0.14 |
| | | | Proline | 70 | natural | NA | 0.14 | 0.12 | 0.10 |
| | Quaker | A | None(control) | NA | NA | NA | 0.26 | 0.23 | 0.20 |
| | | | Proline | 10 | natural | NA | 0.25 | 0.20 | 0.18 |
| | | | Proline | 20 | natural | NA | 0.20 | 0.17 | 0.15 |
| | | B | None(control) | NA | NA | NA | 0.26 | 0.23 | 0.20 |
| | | | Proline | 10 | natural | NA | 0.25 | 0.20 | 0.18 |
| | | | Proline | 20 | natural | NA | 0.20 | 0.17 | 0.15 |
| | | | Proline | 70 | natural | NA | 0.14 | 0.12 | 0.10 |

EG: Electro-zinc-plated substrate
*pH adjusted by adding $H_3PO_4$
**test after having undergone a washing/re-oiling treatment
***test after having undergone a thermal degassing treatment (heat treatment for 24 hours at 210° C. in an oven).

2. The method according to claim 1 further comprising a preliminary step for preparing the steel substrate by hot galvanizating or electro-zinc-plating the steel substrate to form the coating.

3. The method according to claim 1 wherein the metal coating is selected from the group consisting of: a zinc coating GI, a zinc coating GA, a zinc and aluminum alloy, a zinc and magnesium alloy and a zinc, magnesium and aluminum alloy.

4. The method according to claim 3 wherein the metal coating comprises between 0.1 and 10% by weight of Mg and optionally between 0.1 and 20% by weight of Al, the remainder of the metal coating being Zn, the inevitable impurities and optionally at least one additional element selected from the group consisting of: Si, Sb, Pb, Ti, Ca, Mn, Sn, La, Ce, Cr, Ni and Bi.

5. The method according to claim 1 wherein the amino acid is selected from the group consisting of: alanine, aspartic acid, cysteine, methionine, proline, threonine, valine and a mixture thereof, each amino acid being in neutral or salt form.

6. The method according to claim 1 wherein the steel substrate is prepared by electro-zinc-plating to form the metal coating and the amino acid is selected from the group consisting of: aspartic acid, cysteine, methionine, proline, threonine or a mixture thereof, each amino acid being in neutral or salt form.

7. The method according to claim 1 wherein the steel substrate is prepared by hot galvanization to form the metal coating and the amino acid is selected from the group consisting of: alanine, proline, threonine and valine, and a mixture thereof, each amino acid being in neutral or salt form.

8. The method according to claim 1 wherein the amino acid is proline in a neutral or salt form, threonine in a neutral or salt form, or a mixture of proline and threonine, the proline and threonine being in neutral or salt form.

9. The method according to claim 1 wherein the aqueous solution comprises from 1 to 200 g/L of amino acid in neutral or salt form or of a mixture of amino acids in neutral or salt forms or from 10 to 1,750 mmol/L of amino acid in neutral or salt form or a mixture of amino acids in neutral or salt forms.

10. The method according to claim 1 wherein the mass percentage in dry extract of the amino acid in neutral or salt form or of the mixture of amino acids in neutral or salt forms in the aqueous solution is greater than or equal to 75%.

11. The method according to claim 1 wherein the aqueous solution has a pH comprised between a pH equal to the (isoelectric point of the amino acid−3) and a pH equal to the (isoelectric point of the amino acid+1).

12. The method according to claim 11 wherein the aqueous solution has a pH comprised between a pH equal to the (isoelectric point of the amino acid−3) and a pH equal to the (isoelectric point of the amino acid−1).

13. The method according to claim 1 wherein the aqueous solution is applied at a temperature comprised between 20 and 70° C. or for a period comprised between 0.5 s and 40 s on the outer surface of the metal coating.

14. The method according to claim 1 wherein the aqueous solution is applied by roll coating.

15. The method according to claim 1 further comprising, after the application step on the outer surface of the metal coating of the aqueous solution, a drying step.

16. The method according to claim 1 further comprising, after the application step on the outer surface of the metal coating of the aqueous solution and an optional drying step to form a layer consisting of the amino acid or the mixture of amino acids and optionally the acid or the mixture of acids, a step of applying a film of grease or oil on a layer outer surface of the layer.

17. The method according to claim 1 further comprising, after the application step on the outer surface of the metal coating of the aqueous solution, an optional drying step and an optional step of applying a film of grease or oil, a step of shaping the metal sheet.

18. The method according to claim 1 further comprising, after the application step on the outer surface of the metal coating of the aqueous solution, an optional drying step, an optional step of applying a film of grease or oil, and an optional step for shaping the metal sheet, a step of applying locally an adhesive on a layer consisting of the amino acid or the mixture of amino acids and optionally the acid or the mixture of acids, the layer being on the outer surface of the metal coating.

19. The method according to claim 1 wherein the acid is phosphoric acid in a neutral form and in a salt form, or a mixture thereof.

20. A method for preparing a metal sheet comprising the steps of:
  providing a steel substrate, at least one face of the steel substrate being coated with a metal coating comprising at least 40% by weight of zinc;
  applying on an outer surface of the metal coating an aqueous solution consisting of a mixture of:
    water,
    an amino acid selected from the group consisting of: alanine, arginine, aspartic acid, cysteine, lysine, methionine, proline, threonine, valine, each amino acid being in neutral or salt form, and mixtures of said amino acids, each amino acid in the mixture independently in a neutral or salt form, and
    optionally of a base, a mixture of bases, an acid, or a mixture of acids;
  the aqueous solution being free of compound comprising a metal from the group IIIB or from the group IVB and comprising less than 0.005 g/L of iron ions; and
  a mass percentage as dry extract of the amino acid in neutral or salt form or of the mixture of amino acids in neutral or salt forms in the aqueous solution being greater than or equal to 50%, then
  thermally degassing that obtains a metal sheet including a layer consisting of the amino or the mixture of said amino acids and optionally the base, the mixture of bases, the acid, or the mixture of acids.

21. A method for preparing a metal sheet comprising the steps of:
  providing a steel substrate, at least one face of the steel substrate being coated with a metal coating comprising at least 40% by weight of zinc;
  applying on an outer surface of the metal coating an aqueous solution consisting of a mixture of:
    water,
    an amino acid selected from the group consisting of: alanine, arginine, aspartic acid, cysteine, lysine, methionine, proline, threonine, valine, each amino acid being in neutral or salt form, and mixtures of said amino acids, each amino acid in the mixture independently in a neutral or salt form, and
    optionally of a base, a mixture of bases, an acid, or a mixture of acids;
  the aqueous solution being free of compound comprising a metal from the group IIIB or from the group IVB and comprising less than 0.005 g/L of iron ions; and a mass percentage as dry extract of the amino acid in neutral or salt form or of the mixture of amino acids in neutral or salt forms in the aqueous solution being greater than or equal to 50%, upon drying, obtaining the metal sheet including a layer consisting of the amino or the mixture of said amino acids and optionally the base, the mixture of bases, the acid, or the mixture of acids, and performing at least one of the following on the layer consisting of the amino acid or the mixture of said amino acids and optionally the base, the mixture of bases, the acid, or the mixture of acids:
degreasing the metal sheet including the layer;
shaping by drawing the metal sheet including the layer;
cutting the metal sheet including the layer;
applying a film of grease or oil onto the layer;
applying an adhesive based on epoxy onto the layer;
phosphating the metal sheet including the layer; or
performing a cataphoresis on the metal sheet including the layer.

* * * * *